United States Patent
Koh

(10) Patent No.: US 8,568,910 B2
(45) Date of Patent: Oct. 29, 2013

(54) PROTECTIVE CIRCUIT MODULE FOR SECONDARY BATTERY AND BATTERY PACK USING THE SAME

(75) Inventor: Seok Koh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1321 days.

(21) Appl. No.: 11/773,384

(22) Filed: Jul. 3, 2007

(65) Prior Publication Data

US 2008/0008910 A1 Jan. 10, 2008

(30) Foreign Application Priority Data

Jul. 4, 2006 (KR) .................. 10-2006-0062458

(51) Int. Cl.
*H01M 14/00* (2006.01)
*H01M 2/00* (2006.01)
*H01M 10/50* (2006.01)
*H01M 2/08* (2006.01)
*H01M 2/02* (2006.01)

(52) U.S. Cl.
USPC .............. 429/7; 429/61; 429/62; 429/175; 429/178; 429/181

(58) Field of Classification Search
USPC .............. 429/178, 185, 62, 181, 7, 61, 175
See application file for complete search history.

(56) References Cited

U.S. PATENT DOCUMENTS

| 5,673,180 A * | 9/1997 | Pernet ..................... 361/756 |
| 6,152,597 A * | 11/2000 | Potega ..................... 374/185 |
| 6,356,051 B1 * | 3/2002 | Hasunuma et al. .......... 320/107 |
| 6,994,926 B2 | 2/2006 | Ikeuchi et al. |
| 2003/0121142 A1 * | 7/2003 | Kikuchi et al. ............ 29/623.4 |
| 2003/0170530 A1 | 9/2003 | Nishimura et al. |
| 2005/0112456 A1 * | 5/2005 | Kozu et al. .................... 429/62 |
| 2006/0071637 A1 * | 4/2006 | Heo et al. .................... 320/113 |

FOREIGN PATENT DOCUMENTS

| JP | 2003-346917 | 12/2003 |
| KR | 10-2006-0028182 A | 3/2006 |
| WO | WO 01/99211 A1 | 12/2001 |

OTHER PUBLICATIONS

Patent Abstracts of Japan, Publication No. 2003-346917; Date of Publication: Dec. 5, 2003; in the name of Atsushi Kawakado et al.

* cited by examiner

*Primary Examiner* — Eugenia Wang
(74) *Attorney, Agent, or Firm* — Christie, Parker & Hale, LLP

(57) ABSTRACT

A protective circuit module for a secondary battery includes a circuit board. At least one protection control circuit element for preventing overcharge and over-discharge of the secondary battery is mounted on the circuit board. A first conductive pad is coupled to the circuit board. A positive temperature coefficient device is between the at least one protection control circuit and the first conductive pad such that when a secondary battery temperature reaches a threshold value, resistance of the positive temperature coefficient device is increased and battery current is reduced.

15 Claims, 13 Drawing Sheets

PROTECTIVE CIRCUIT MODULE FOR SECONDARY BATTERY AND BATTERY PACK USING THE SAME

CROSS-REFERENCE TO RELATED APPLICATIONS

This application claims priority to and the benefits of Korean Patent Application No. 10-2006-0062458, filed on Jul. 4, 2006, in the Korean Intellectual Property Office, the entire content of which is incorporated herein by reference.

BACKGROUND

1. Field of the Invention

The present invention relates to a secondary battery, and more particularly, to a protective circuit module for a secondary battery having improved mountability and configuration.

2. Discussion of Related Art

In general, a secondary battery is a rechargeable battery. High performance secondary batteries are divided into Ni-MH secondary batteries and lithium secondary batteries. Lithium secondary batteries include lithium metal secondary batteries, lithium ion secondary batteries (polygon type, cylinder type, and pouch type), lithium ion polymer secondary batteries, and lithium polymer secondary batteries.

Power demands of small secondary batteries are greater due to such batteries being used to power mobile telephones, laptop computers, and personal digital assistants. Lithium ion secondary batteries and lithium ion polymer batteries are the most commonly used lithium secondary batteries.

Lithium ion secondary batteries generally have a greater stability than lithium metal secondary batteries. However, since the main components of such batteries (such as a positive electrode, a negative electrode, and an electrolyte) are combustible, various safety apparatus are mounted in the battery to improve stability.

For example, a positive temperature coefficient (PTC) material may be used as a safety device. When a temperature rises above a certain threshold in the PTC material, electric resistance increases to infinity, allowing immediate cessation of charging and discharging current when the temperature of the battery is higher than the threshold temperature. In general, the PTC material threshold temperature is set at about 100° C. (the temperature is also referred to as a "trip temperature"). The trip temperature is lower than the shut down temperature of the separator interposed between the positive electrode and the negative electrode. Therefore, when overcurrent occurs, the PTC device prevents the temperature from increasing. When it is not possible for the PTC device alone to prevent the temperature from increasing, the separator is shut down to prevent thermal runaway.

Additionally, a protective circuit module may be mounted in the secondary battery to prevent overcharge and overdischarge. The protective circuit module commonly includes a circuit board, a plurality of electronic elements mounted on the circuit board, a charging switch, and a discharging switch. Furthermore, the protective circuit module is commonly mounted on an outer surface of the secondary battery and molded by a resin.

In a conventional secondary battery, because the PTC device and protective circuit module are mounted in the secondary battery during the pack assembly process, the mountability and configurability of the PTC device and protective circuit module deteriorate. For example, the PTC device is connected to electrode tabs protruding from the secondary battery and to the protective circuit module using a conductive lead, resulting in the electrode tabs and conductive leads being folded multiple times to minimize their volume. As a result, the PTC device is not attached adjacent to the protective circuit module or the secondary battery. Therefore, when the temperature of the secondary battery increases, a delay may occur before the PTC material is activated.

In a conventional secondary battery, the PTC device and the protective circuit module are molded by a resin so as to be integrated with the secondary battery. The protective circuit module is designed to not protrude from the resin molding. Therefore, it is difficult to accurately position electrode terminals in the protective circuit module, resulting in the resin being formed in undesired positions with respect to the electrode terminals. When regions of the electrode terminals are covered with resin, the electrode terminals may not electrically connect to an external charger or an external system.

SUMMARY OF THE INVENTION

A protective circuit module for a secondary battery includes: a circuit board; at least one protection control circuit element on the circuit board for preventing overcharge and over-discharge of the secondary battery; a first conductive pad coupled to the circuit board; and a positive temperature coefficient device between the at least one protection control circuit element and the first conductive pad such that when a secondary battery temperature reaches a threshold value, resistance of the positive temperature coefficient device is increased and battery current is reduced.

The positive temperature coefficient device may include: a first conductive plate resistance welded to the first conductive pad; a positive temperature coefficient resistance element connected to the first conductive plate; and a second conductive plate connected to the positive coefficient resistance element.

The first conductive plate may be serial resistance welded to the first conductive pad such that at least two serial resistance welds are formed on a surface of the first conductive plate.

The positive temperature coefficient resistance element may be located between the first conductive plate and the second conductive plate.

A second conductive pad may be spaced from the first conductive pad on the circuit board. A first conductive lead may be connected to the first conductive plate, the first conductive lead being connectable to a first conductive tab of the secondary battery. A second conductive lead may be connected to the second conductive pad, the second conductive lead being connectable to a second conductive tab of the secondary battery.

A through hole may be provided in the circuit board such that the first conductive pad may be coupled to the through hole.

A through hole may be provided in the circuit board and the first conductive pad may include a protrusion coupled with the through hole in the circuit board and a plate portion connected to the protrusion and welded to the circuit board by solder. The positive temperature coefficient device may be resistance welded to the plate portion.

The positive temperature coefficient device may include: a first conductive plate resistance welded to the plate portion; a positive temperature coefficient resistance element connected to the first conductive plate; and a second conductive plate connected to the positive temperature coefficient resistance element.

The first conductive plate may be direct resistance welded to the plate portion to form a direct resistance weld on the first conductive plate and a direct resistance weld on the protrusion.

The circuit board may include two longitudinal edges, at least one circuit board protrusion being formed on each longitudinal edge.

The positive temperature coefficient resistance element may be circular

In accordance with another exemplary embodiment, a battery pack is provided including a secondary battery. A first electrode tab and a second electrode tab protrude from the secondary battery. A protective circuit is provided including: a circuit board; at least one protection control circuit element for preventing overcharge and over-discharge of the secondary battery; a first conductive pad coupled to the circuit board; and a positive temperature coefficient device between the at least one protection control circuit element and the first conductive pad such that when a secondary battery temperature reaches a threshold value, resistance of the positive temperature coefficient device is increased and battery current is reduced. A resin secures the protective circuit module to the secondary battery while exposing the electrode terminals of the circuit board.

A second conductive pad may be spaced from the first conductive pad on the circuit board. A first conductive lead may be connected to the first conductive plate, the first conductive lead being connected to a first conductive tab of the secondary battery. A second conductive lead may be connected to the second conductive pad, the second conductive lead being connected to a second conductive tab of the secondary battery.

The first conductive lead may be folded to provide a first conductive lead U-shaped fold and the second conductive lead may be folded to provide a second conductive lead U-shaped fold. Insulating paper may be located within both the first conductive U-shaped fold and the second conductive lead U-shaped fold.

As described above, according to the present invention, since the PTC is previously integrated with the protective circuit module, processes of coupling the PTC, the protective circuit module, and the secondary battery with each other and of connecting the PTC, the protective circuit module, and the secondary battery to each other are simplified.

Also, according to the present invention, since the PTC device is connected to the protective circuit module by the serial resistance welding or direct resistance welding method, a high temperature is not applied to the PTC material so that it is possible to prevent the characteristics of the PTC device from deteriorating.

Also, according to the present invention, when the through hole is formed in the circuit board in order to perform the direct resistance welding on the PTC device, the protrusions are formed on the conductive pad to be coupled with the conductive pad so that defects in the external appearance are not generated by the through hole during the resin molding process.

Also, according to the present invention, the resin molding is performed in a state where the protective circuit module is erected in front of the secondary battery so that it is possible to reduce the size of the battery pack and to increase the capacity of the battery pack of the same size.

Also, according to the present invention, the protrusions of a predetermined thickness are further formed on each of the top and bottom of the protective circuit module so that it is possible to correctly position the electrode terminals formed in the protective circuit module in the right center, to prevent the resin from being formed to the undesired positions of the electrode terminals, and to thus prevent the defects in the external appearance from being generated.

DETAILED DESCRIPTION

Figure 1A:
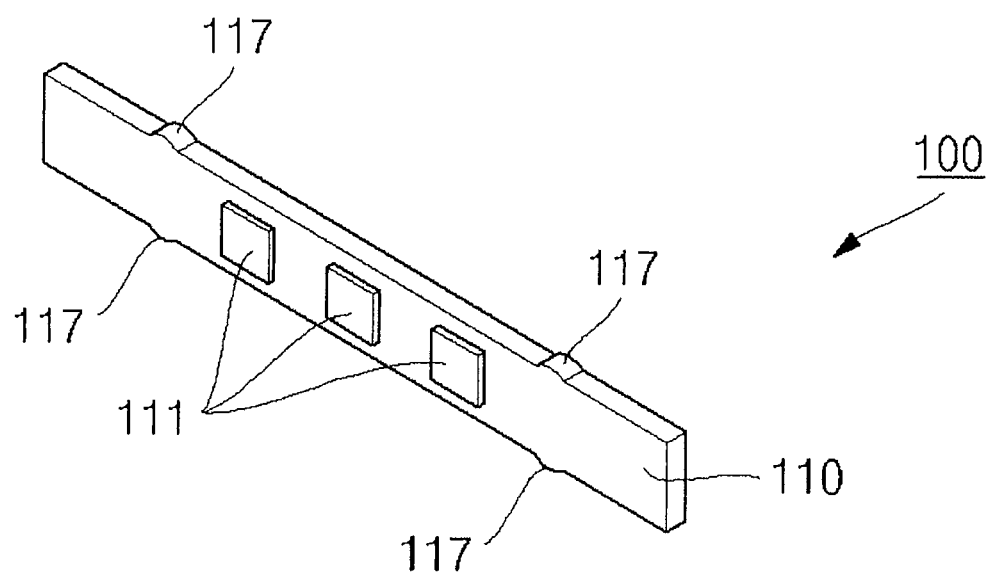
FIG. 1A is a front perspective view of a protective circuit module for a secondary battery according to an exemplary embodiment of the present invention.
Figure 1B:
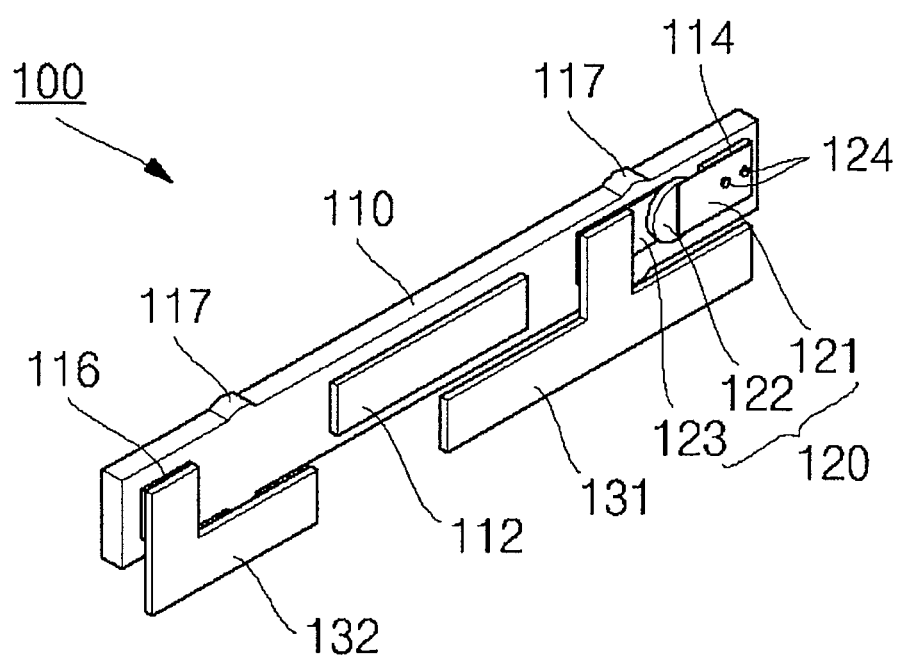
FIG. 1B is a rear perspective view of the protective circuit module of FIG. 1A.
Figure 1C:
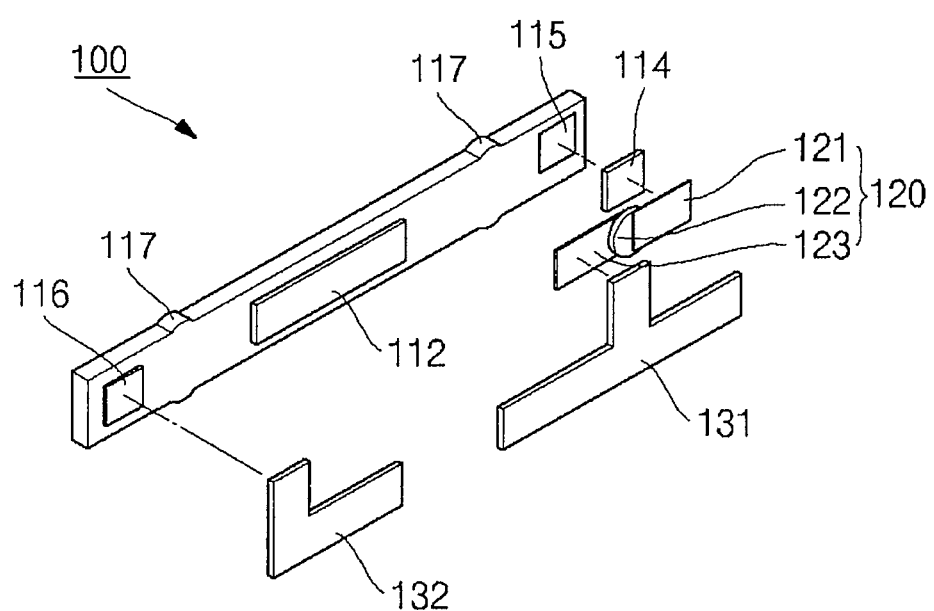
FIG. 1C is a rear exploded perspective view of the protective circuit module of FIG. 1A.

As illustrated in FIGS. 1A to 1C, an exemplary protective circuit module 100 for a secondary battery includes a circuit board 110, a PTC device 120 connected to the circuit board 110, and conductive leads 131, 132 connected to the circuit board 110 and to the PTC device 120.

Figure 5A:
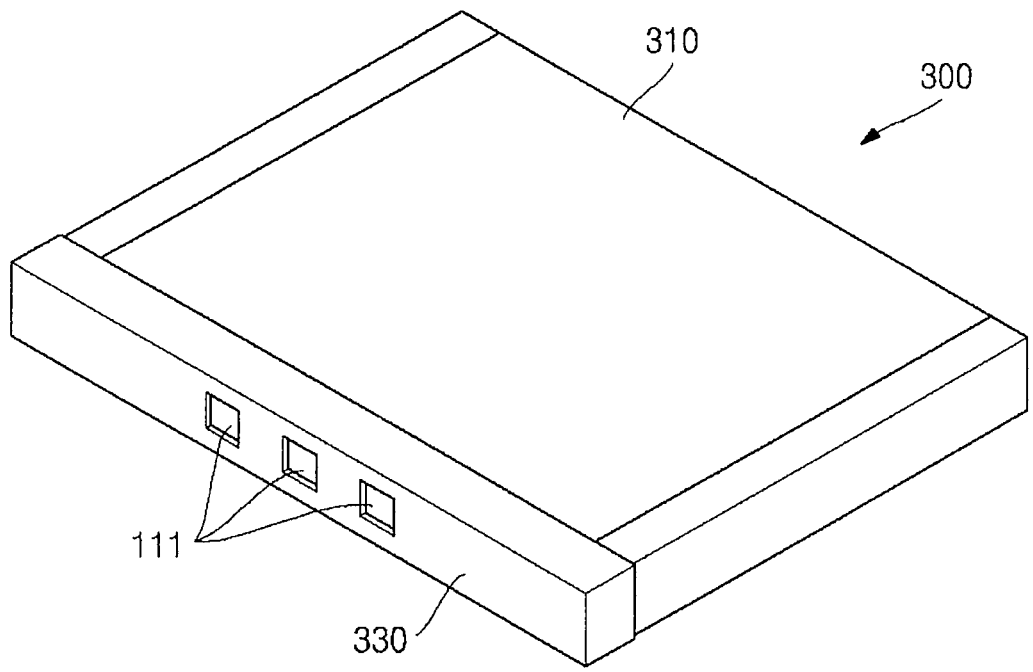
FIG. 5A is a perspective view of a battery pack including a protective circuit module according to still another exemplary embodiment of the present invention.

A rigid printed circuit board (RPCB), a flexible printed circuit board (FPCB), or an equivalent can be used as the circuit board 110, but is not limited thereto. Electrode terminals 111 are formed on a planar surface of the circuit board 110 and protection control circuit elements 112 are mounted on a planar surface of the circuit board 110. The electrode terminals 111 may be electrically connected to an external charger or an external system, and the plurality of protection control circuit elements 112 connected to electrode terminals 111 through the circuit board may prevent the overcharge, over-discharge, and over-current of a secondary battery 310 (FIG. 5A). A first conductive pad 114 and a second conductive pad 116 may be soldered onto a planar surface of the circuit board 110 on either side of the protection control circuit elements 112. However, the present invention is not limited to such a solder connection method. Also, two circuit board protrusions 117 are formed on both longitudinal edges of the circuit board 110. The circuit board protrusions 117 are located such that the electrode terminals 111 are positioned between them on the planar surface of the circuit board to prevent a resin defect (e.g., uneven application of the resin)

from being generated during a resin molding process, as described in more detail below.

In one exemplary embodiment, the circuit board 110 is slightly thinner than the secondary battery. As such, the resin may be formed in the undesired regions of the electrode terminals 111 during the resin molding process. However, the protrusions 117 compensate for the height of the circuit board 110, ensuring accurate placement of the circuit board 110 during the resin molding process. Accordingly, the electrode terminals 111 are also accurately positioned so that the resin is not formed in the undesired regions of the electrode terminals 111.

The PTC device 120 includes, for example, a first conductive plate 121 connected to the first conductive pad 114, the first conductive plate 121 connected to a first interior-facing surface of a disk-shaped positive temperature coefficient resistance element 122, and a second conductive plate 123 connected to a second interior-facing surface of the disk-shaped positive temperature coefficient element 122. Therefore, the PTC device 120 does not protrude beyond an edge from the circuit board 110. Additionally, the first conductive plate 121 may be serial resistance welded to the first conductive pad 114 so that at least two serial resistance welds 124 are formed on the surface of the first conductive plate 121. Therefore, excessive heat is not transmitted to the element 122 during connection of the PTC device 120 to the circuit board 110, preventing deterioration of the element 122.

A first conductive lead 131 may be connected to the second conductive plate 123 by, for example, serial resistance welding. In one exemplary embodiment, the first conductive lead 131 may be T-shaped having a region protruding from the circuit board 110 for contacting an electrode tab protruding from the secondary battery. However, the protruding region may be folded, for example into a U-shape, during manufacture of the battery pack to create a contact area. The second conductive lead 132 may be directly connected to the second conductive pad 116, for example, by the solder 115. In one exemplary embodiment, the second conductive lead 132 is L shaped having a region protruding from the circuit board 110 for contacting an electrode tab protruding from the secondary battery. Such protruding region may also be folded into a U-shape during manufacture of the battery pack to create a contact area.

Figure 2A:
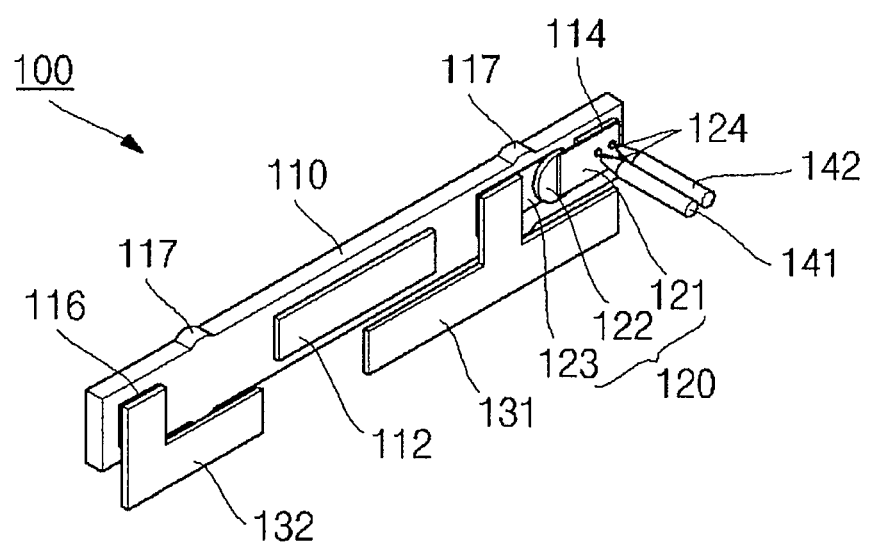
FIGS. 2A and 2B are a perspective view and a cross-sectional view, respectively, of a PTC device serial resistance welded to a protective circuit module according to an exemplary embodiment of the present invention.
Figure 2B:
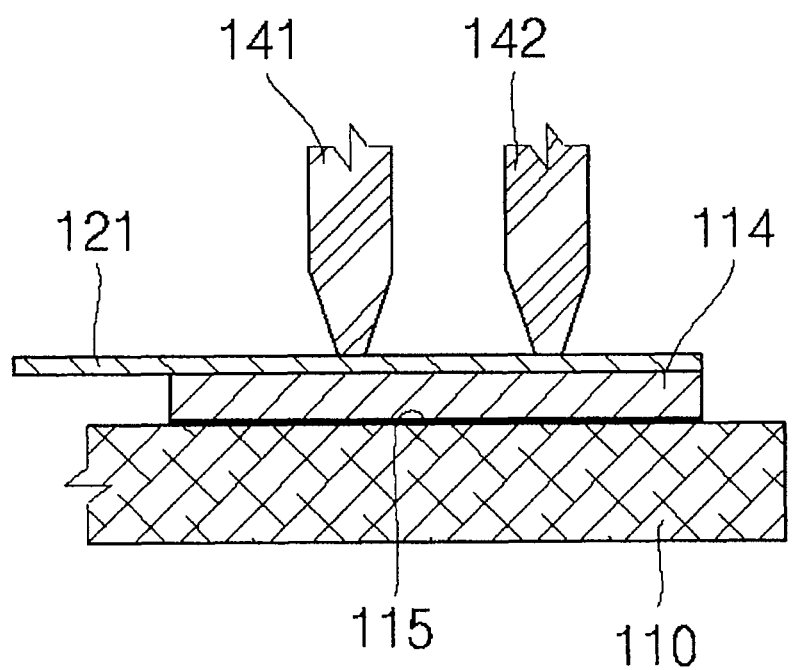

With reference to FIGS. 2A and 2B, the first conductive plate 121 may be serial resistance welded to the first conductive pad 114 and the first conductive pad 114 may be welded to the circuit board 110 by the solder 115. To perform the serial resistance welding, two resistance welding rods 141, 142 are connected to the first conductive plate 121 such that current flows from the welding rods 141, 142 through the first conductive plate 121 and the first conductive pad 114 to form the two serial resistance welds 124 on the first conductive plate 121. High temperature is not applied to the PTC device 120 by the serial resistance welding, preventing deterioration of the PTC material.

Figure 3A:
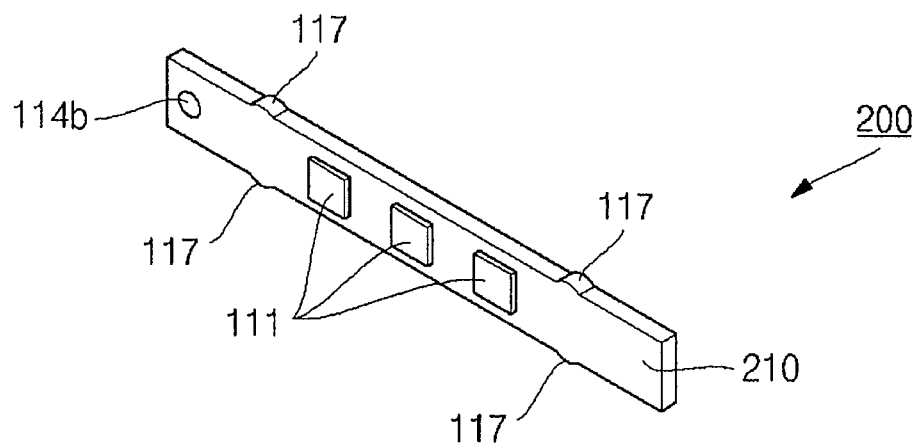
FIG. 3A is a front perspective view of a protective circuit module for a secondary battery according to another exemplary embodiment of the present invention.
Figure 3B:
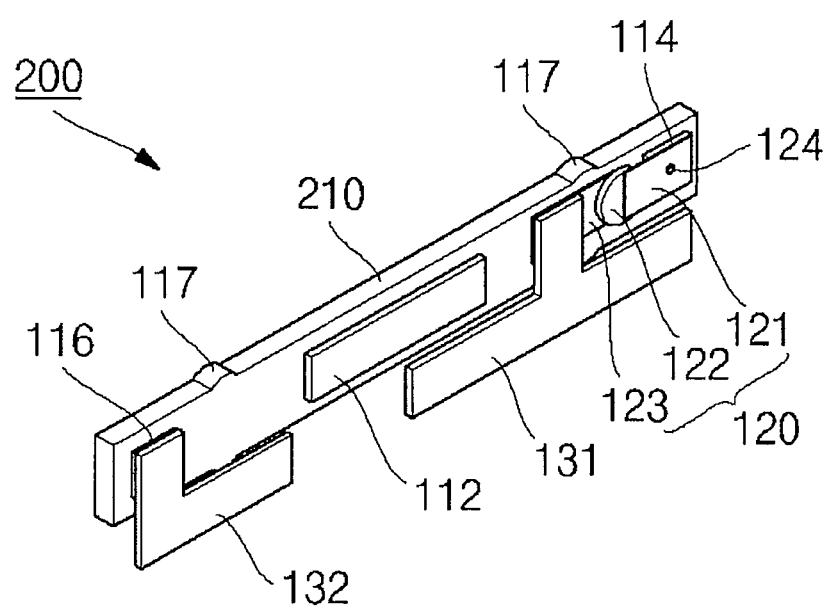
FIG. 3B is a rear perspective view of the protective circuit module of FIG. 3A.
Figure 3C:
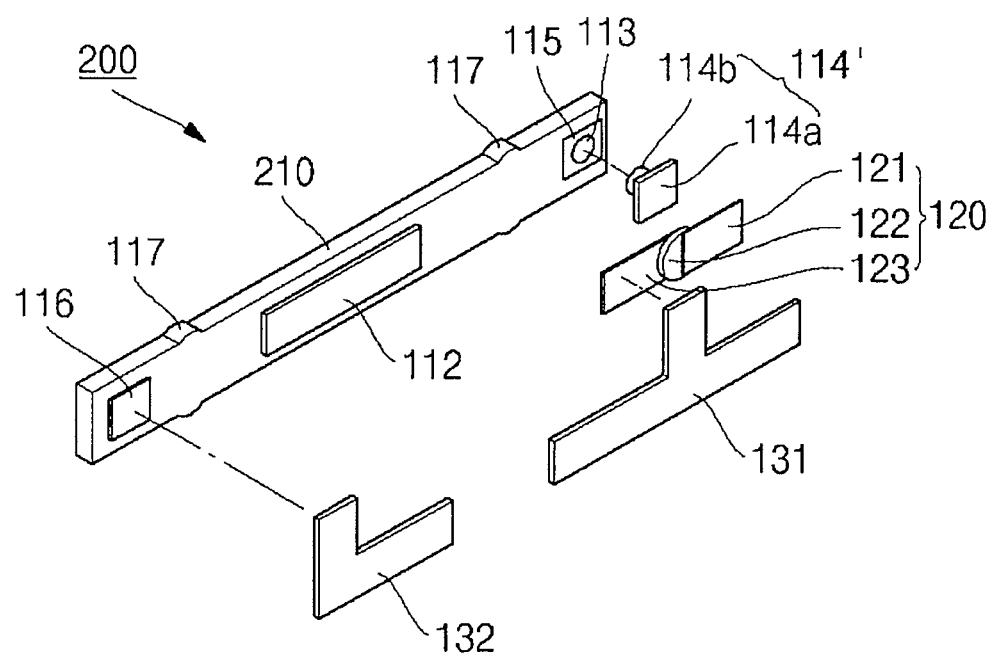
FIG. 3C is a rear exploded perspective view of the protective circuit module of FIG. 3A.

Referring to FIGS. 3A to 3C, a protective circuit module 200 for a secondary battery according to another exemplary embodiment of the present invention includes a circuit board 210, a PTC device 120 connected to the circuit board 110, and conductive leads 131, 132 connected to the circuit board 110 and to the PTC device 120, similarly to the previously described protective circuit modules. One planar surface of the circuit board 210 includes a through hole 113 (FIG. 3C). The first conductive pad 114' may include, for example, a protrusion 114b coupleable with the through hole 113 and a planar plate unit 114a attached to the protrusion 114b and welded to the circuit board 210 by the solder 115.

Figure 4A:
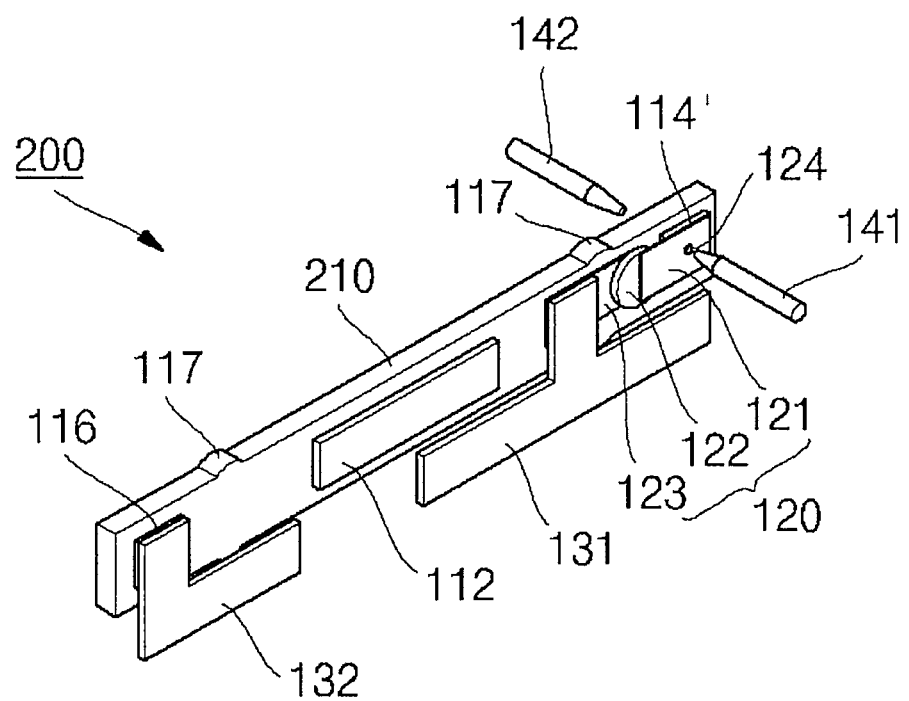
FIGS. 4A and 4B are a perspective view and a cross-sectional view, respectively, of a PTC device direct resistance welded to a protective circuit module according to yet another exemplary embodiment of the present invention.
Figure 4B:
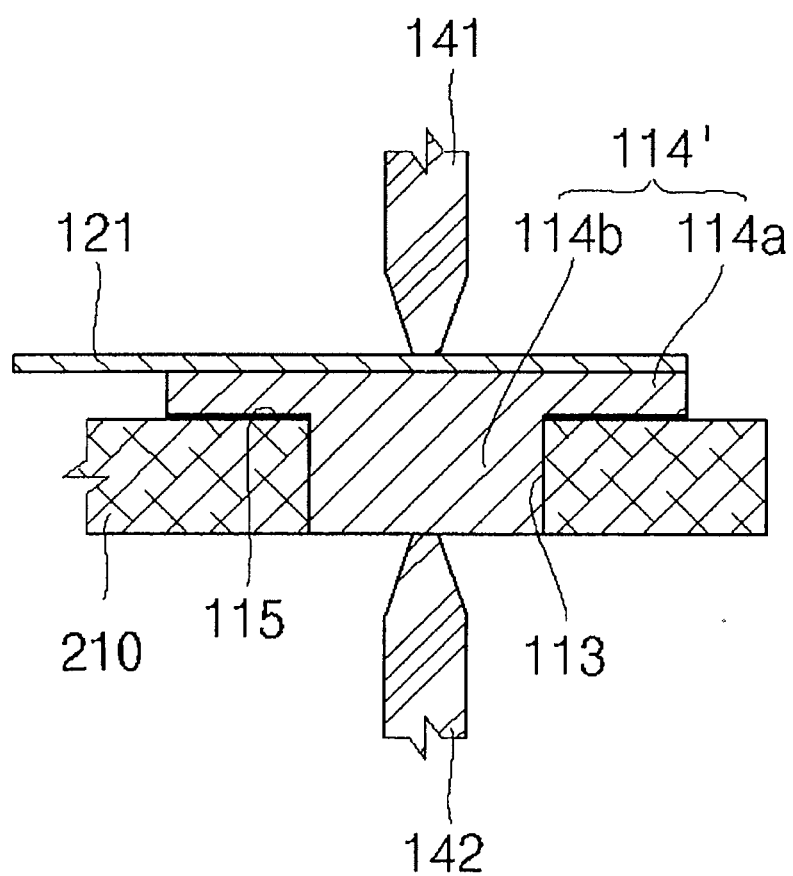

With reference also to FIGS. 4A and 4B, the first conductive plate 121 may be direct resistance welded to the planar plate unit 114a so that one direct resistance weld 124 is formed on the first conductive plate 121. More specifically, a first resistance welding rod 141 is connected to the first conductive plate 121 and a second resistance welding rod 142 is connected to the protrusion 114b, the second resistance welding rod opposing the first resistance welding rod. Current from the first resistance welding rod 141 connected to the first conductive plate 121 flows to the second resistance welding rod 142 through the first conductive plate 121, the planar plate unit 114a, and the protrusion 114b in either direction. Therefore, the direct resistance weld is formed on the first conductive plate 121 and the protrusion 114b. High temperatures are not applied to the PTC device 120 by direct resistance welding, preventing deterioration of the PTC device 120.

Figure 5B:
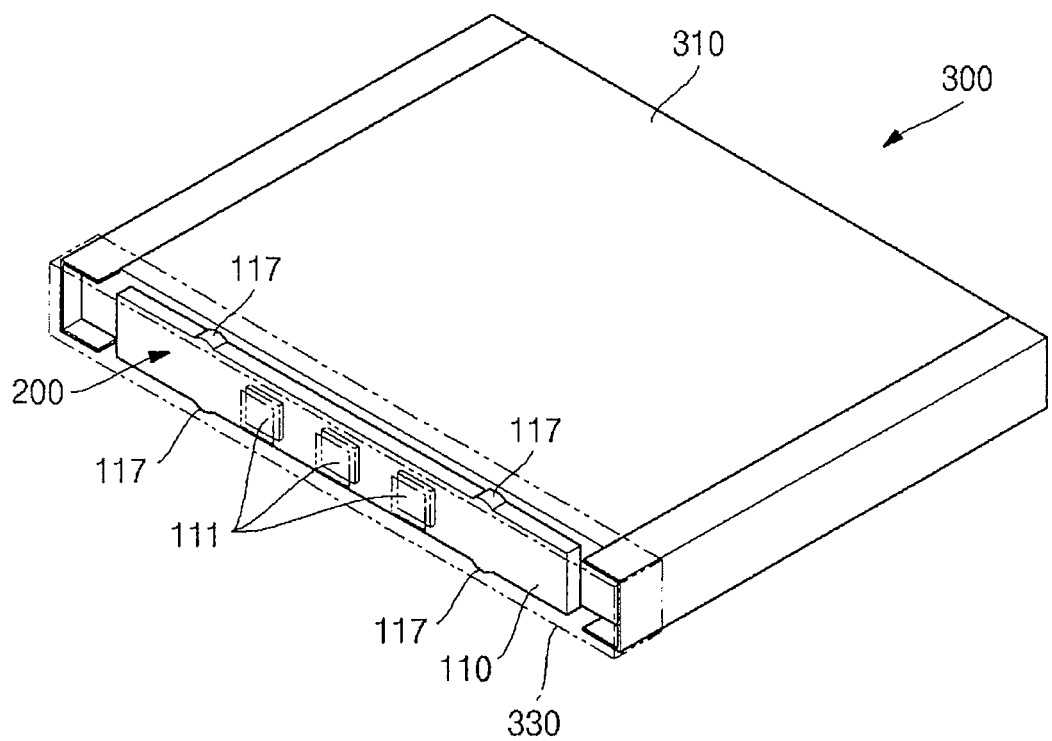
FIG. 5B is a perspective view of an exemplary protective circuit module attached to a secondary battery before resin molding is performed.
Figure 5C:
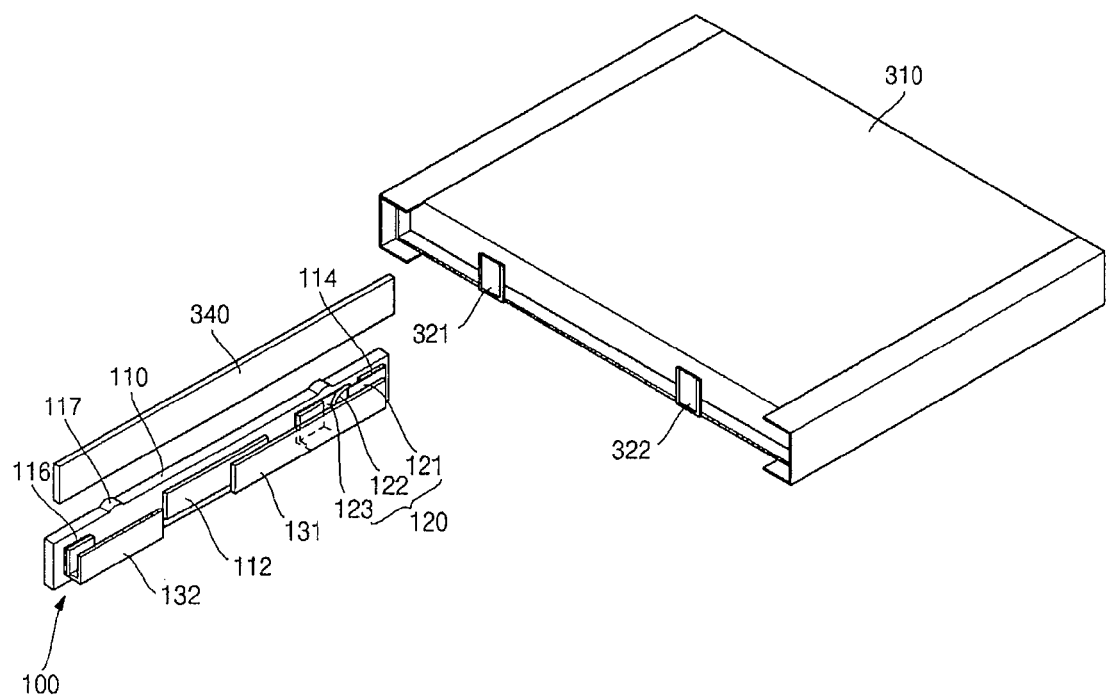
FIG. 5C is an exploded perspective view of a protective circuit module, an insulating paper, and a secondary battery according to an exemplary embodiment of the present invention.

With reference to FIGS. 5A-5C, an exemplary battery pack 300 of the present invention includes a protective circuit module 110. Although the structure of the battery pack 300 is not limited to the specifically described protective circuit module, the protective circuit module 100 described above is illustrated as an example.

The battery pack 300 includes a secondary battery 310 from which a first electrode tab 321 and a second electrode tab 322 protrude. The protective circuit module 100 may be electrically connected to the first electrode tab 321 and to the second electrode tabs 322. The battery pack 300 may include a resin 330 for fixing the protective circuit module 100 to the secondary battery 310.

Exemplary secondary batteries 310 may include a lithium ion secondary battery, a lithium ion polymer secondary battery, a lithium polymer secondary battery, or an equivalent, but are not limited to those specified.

The circuit board 110 may be located along one edge of the secondary battery 310 to minimize the thickness of the battery pack 300. The first conductive lead 131 and the second conductive lead 132 may be folded, creating a substantially U-shaped portion, one side of the "U" adapted to be connected to the first electrode tab 321 and the second electrode tab 322, respectively. Accordingly, the first conductive lead 131 and the second conductive lead 132 do not protrude from the bottom region of the circuit board 110. The first conductive lead 131 may be directly connected to the first conductive plate 121 of the PTC device 120 or to the electronic element 112. An elongate insulating paper 340 may be located between folded portions of the first conductive lead 131 and the second conductive lead 132. The insulating paper 340 prevents a short circuit between the first conductive lead 131 and the first conductive plate 121 and/or the electronic element 112 and between the second conductive lead 132 and the electronic element 112.

The resin 330 wraps around the protective circuit module 100 to secure the protective circuit module 100 to the secondary battery 310. However, the plurality of electrode terminals 111 are exposed to the exterior, allowing a charger and/or other external systems to be electrically connected to the electrode terminals 111. The two protrusions 117 on the top and bottom surfaces of the circuit board 110 compensate for the circuit board 110 being thinner than the height of the rest of the battery, and provide support for the resin 330 to be accommodate evenly across the planar sides of the battery 310.

As described above, the PTC device 120 being integrated with the circuit board 110 allows for improved mounting and assembly. Additionally, heat generated by the secondary battery 310 is directly transmitted through the first electrode tab 321 and the first conductive lead 131 and heat is also directly transmitted to the PTC device 120 through the resin 330. Furthermore, since the PTC device 120 is connected to the circuit board 110 through the first conductive pad 114, the heat of the secondary battery 310 is also transmitted to the PTC device 120 through the circuit board 110 and the first conductive pad 114. Therefore, heat is effectively transferred to the PTC device 120 allowing the PTC device 120 to activate almost instantaneously when the temperature of the secondary battery 310 reaches a certain level.

Additionally, since the PTC is integrated with the protective circuit module, coupling the PTC, the protective circuit module, and the secondary battery together is simplified. Furthermore, since the PTC is connected to the protective circuit module by serial resistance welding or direct resistance welding, the PTC is not exposed to high temperatures, thus preventing deterioration of the PTC.

Although exemplary embodiments of the present invention have been shown and described, it will be appreciated by those skilled in the art that changes may be made to these embodiments without departing from the principles and spirit of the invention, the scope of which is defined in the claims and their equivalents.

What is claimed is:

1. A protective circuit module for a secondary battery comprising:
    a circuit board having a through hole;
    at least one protection control circuit element on the circuit board for preventing overcharge and over-discharge of the secondary battery;
    a first conductive pad coupled to the circuit board, wherein the first conductive pad comprises:
        a protrusion coupled with the through hole in the circuit board; and
        a plate portion connected to the protrusion and coupled to the circuit board by solder; and
    a positive temperature coefficient device between the at least one protection control circuit element and the first conductive pad, wherein the positive temperature coefficient device is resistance welded to and directly contacts the plate portion such that when a secondary battery temperature reaches a threshold value, resistance of the positive temperature coefficient device is increased and battery current is reduced,
    wherein the positive temperature coefficient device comprises:
    a first conductive plate resistance welded to the plate portion;
    a positive temperature coefficient resistance element connected to the first conductive plate; and
    a second conductive plate connected to the positive temperature coefficient resistance element,
    wherein the second conductive plate directly contacts both the circuit board and the positive temperature coefficient resistance element.

2. The protective circuit module as claimed in claim 1 further comprising:
    a second conductive pad spaced from the first conductive pad on the circuit board;
    a first conductive lead connected to the second conductive plate, the first conductive lead being connectable to a first conductive tab of the secondary battery; and
    a second conductive lead connected to the second conductive pad, the second conductive lead being connectable to a second conductive tab of the secondary battery.

3. The protective circuit module as claimed in claim 1, wherein the first conductive plate is direct-resistance welded to the plate portion to form a direct-resistance weld on the first conductive plate and a direct-resistance weld on the protrusion.

4. The protective circuit module of claim 1, wherein the resistance element is circular.

5. The protective circuit module as claimed in claim 1, wherein the positive temperature coefficient resistance element is between the first conductive plate and the second conductive plate.

6. The protective circuit module as claimed in claim 1, wherein the circuit board further comprises two longitudinal edges and has at least one circuit board protrusion on each longitudinal edge.

7. A battery pack comprising:
    a secondary battery;
    a first electrode tab and a second electrode tab each protruding from the secondary battery;
    a protective circuit module comprising:
        a circuit board;
        at least one protection control circuit element on the circuit board for preventing overcharge and over-discharge of the secondary battery;
        a first conductive pad welded to the circuit board; and
        a positive temperature coefficient device between the at least one protection control circuit element and the first conductive pad, wherein the first conductive pad directly contacts a first side of the positive temperature coefficient device such that when a secondary battery temperature reaches a threshold value, resistance of the positive temperature coefficient device is increased and battery current is reduced;
    a first conductive lead spaced from the first conductive pad and electrically coupled to a second side of the positive temperature coefficient device opposite to the first side; and
    a resin securing the protective circuit module to the secondary battery while exposing electrode terminals on the circuit board,
    wherein the positive temperature coefficient device comprises:
    a first conductive plate resistance welded to the first conductive pad;
    a positive temperature coefficient resistance element connected to the first conductive plate; and
    a second conductive plate connected to the positive temperature coefficient resistance element,
    wherein the second conductive plate directly contacts both the circuit board and the positive temperature coefficient resistance element.

8. The protective circuit module as claimed in claim 7, wherein the first conductive plate is serial resistance welded to the first conductive pad such that at least two serial resistance welds are formed on a surface of the first conductive plate.

9. The battery pack as claimed in claim 7, wherein the first conductive pad comprises:
    a protrusion coupled with a through hole on the circuit board; and
    a plate portion connected to the protrusion and coupled to the circuit board by solder;
    wherein the positive temperature coefficient device is resistance welded to the plate portion.

10. The battery pack as claimed in claim 7, further comprising:
    a second conductive pad spaced from the first conductive pad on the circuit board; and a second conductive lead connected to the second conductive pad, the second conductive lead being connected to a second conductive tab of the secondary battery; and wherein the first conductive lead is connected to a first conductive tab of the secondary battery.

11. The battery pack as claimed in claim 10, wherein the first conductive lead has a folded configuration to provide a first conductive lead U-shaped fold and the second conductive lead has a folded configuration to provide a second conductive lead U-shaped fold.

12. The battery pack as claimed in claim 11, wherein insulating paper is located within both the first conductive lead U-shaped fold and the second conductive lead U-shaped fold.

13. The battery pack as claimed in claim 7, wherein the circuit board has two longitudinal edges and has at least one circuit board protrusion on each of the two longitudinal edges.

14. The battery pack as claimed in claim 7, wherein the positive temperature coefficient resistance element is circular.

15. The battery pack as claimed in claim 7, wherein the battery current is reduced to substantially zero when the secondary battery temperature reaches the threshold value.

* * * * *